United States Patent
Bachl et al.

(10) Patent No.: US 7,280,499 B2
(45) Date of Patent: Oct. 9, 2007

(54) METHOD FOR IMPROVING THE RECEPTION OF A CDMA RECEIVER, AND A CDMA RECEIVER WITH IMPROVED RECEPTION

(75) Inventors: Rainer Bachl, Nuremberg (DE); Wolfgang Helmut Gerstacker, Nuremberg (DE); Richard Rau, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 933 days.

(21) Appl. No.: 10/134,843

(22) Filed: Apr. 29, 2002

(65) Prior Publication Data

US 2003/0031237 A1 Feb. 13, 2003

(30) Foreign Application Priority Data

May 29, 2001 (EP) .................................. 01304709

(51) Int. Cl.
*H04B 7/216* (2006.01)
(52) U.S. Cl. ...................................... 370/320; 370/241
(58) Field of Classification Search ................ 370/320, 370/335, 342, 441, 332, 333, 252, 241
See application file for complete search history.

(56) References Cited

U.S. PATENT DOCUMENTS 5,799,011 A  8/1998  La Rosa
6,104,747 A *  8/2000  Jalloul et al. ................ 375/150
6,208,632 B1  3/2001  Kowalski et al.

FOREIGN PATENT DOCUMENTS

EP  0 893 888 A2  1/1999
EP  1 158 696 A2  11/2001
WO  WO 00/33472  6/2000

OTHER PUBLICATIONS

XP 000636095 Correlation Statistics Distribution Convolution (CSDC) Modeling for Studying CDMA Indoor Wireless Systems with RAKE Receiver, Power Control & Multipath Fading by Xioa Hua Chen IEICE Oct. 1996.

* cited by examiner

*Primary Examiner*—Brenda Pham

(57) ABSTRACT

The invention relates in general to systems for digital transmission, for example digital mobile radio systems such as the UMTS (Universal Mobile Telecommunications System) and in particular to the receiving-end estimation of parameters which are required for retrieving the data.

An object of the invention resides, in particular, in indicating an efficient way which, particularly in the case of CDMA systems with power control, ensures estimates of higher quality than with methods of the prior art, and simultaneously largely avoids a substantial increase in the complexity of system implementation.

For this purpose, the invention proposes a method for improving the reception of a CDMA receiver based on a parameter estimation method, as well as a correspondingly adapted CDMA receiver, in which the estimates are produced by processing received values ($y_i[k]$) provided with correction factors (s), the correction factors (s) serving to equalize different power levels of the received signal.

13 Claims, 3 Drawing Sheets

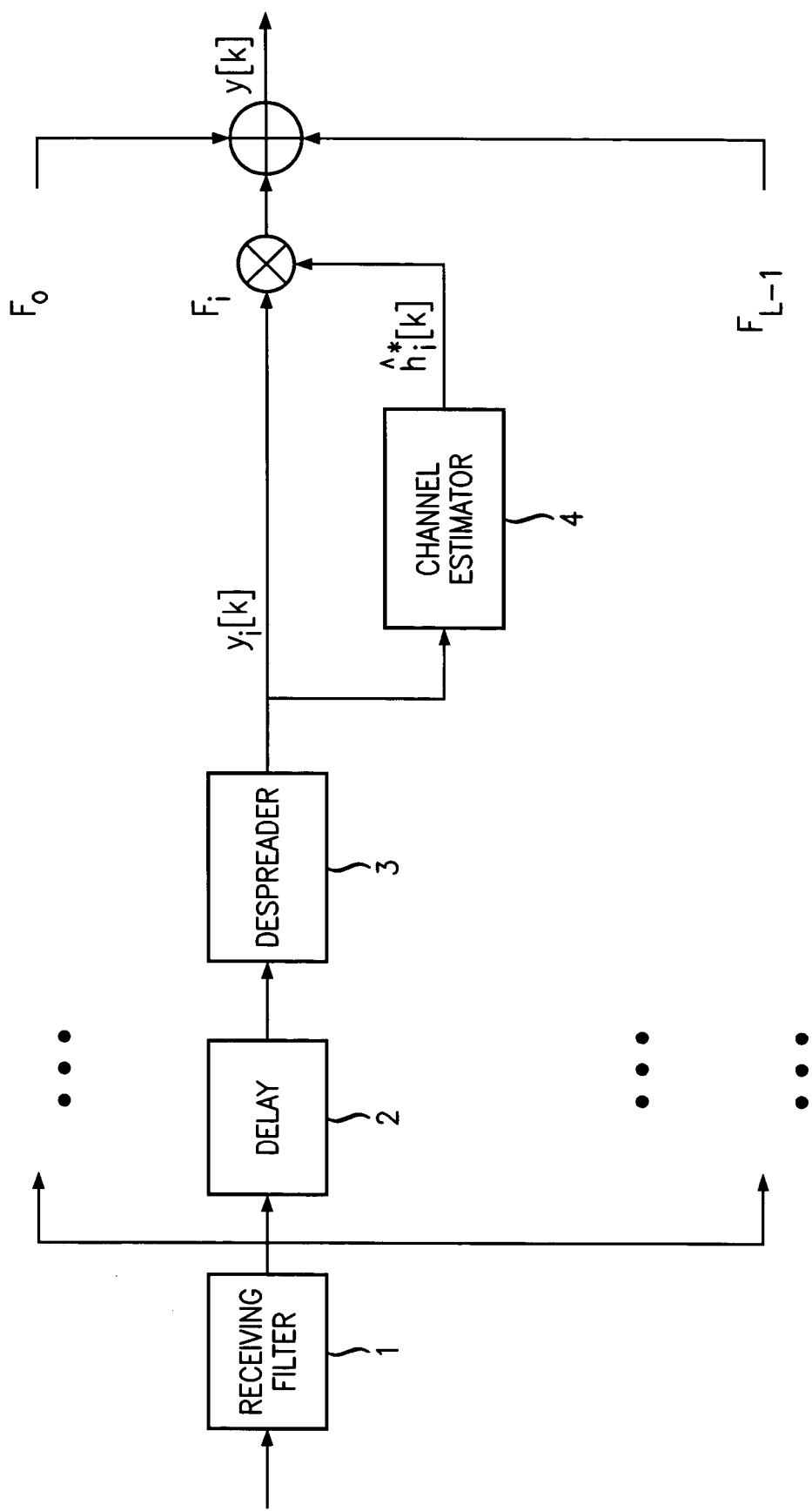

METHOD FOR IMPROVING THE RECEPTION OF A CDMA RECEIVER, AND A CDMA RECEIVER WITH IMPROVED RECEPTION

CROSS REFERENCE TO RELATED APPLICATION

This application claims priority of European Application No. 01304709.7 filed on May 29, 2001.

1. Field of the Invention

The invention relates in general to systems for digital transmission, for example digital mobile radio systems such as the UMTS (Universal Mobile Telecommunications System), and in particular to a method for improving the receiving-end estimation of parameters which are required for retrieving the data, and a receiver of a CDMA (Code Division Multiple Access) system adapted for carrying out the method.

2. Background of the Invention

As is known in this field, examples of parameter estimation methods are methods for estimating a frequency offset between modulator and demodulator, which is subsequently compensated, and/or channel estimation methods which are required, for example to set the coefficients for a rake receiver so as to eliminate channel distortions. For the purpose of better comprehension of a rake receiver, reference may be made, in particular, to the publication by A. J. Viterbi, "CDMA", Addison-Wesley, Reading, Mass., 1995, the subject-matter of which is to be regarded in full as part of the disclosure content of the present application.

Particularly in the case of digital transmission over dispersive channels, for example via a mobile radio channel, the transmitted signal is distorted and disturbed by noise. The channel distortions necessitate special concepts for retrieving the transmitted data; for example a receiving-end sequence estimation with the aid of the Viterbi algorithm is carried out in a TDMA (Time Division Multiple Access) transmission, as is used in the case of GSM systems. When transmission is done using the CDMA (Code Division Multiple Access) method, as happens in third-generation mobile radio systems, for example in UMTS systems, retrieval is possible by means of a rake receiver, for example. Methods which are more complicated, but also more powerful, are based, in particular, on a multiuser detection, supplementary reference being made for this purpose to the publication by S. Verdu, "Multiuser Detection", Cambridge University Press, Cambridge, 1998.

The reception methods conventionally require estimates of the channel pulse response. In most CDMA systems known pilot symbols whose corresponding received values can be used to carry out the estimation are transmitted to the receiver for this purpose. A multiplicity of channel estimation methods in the literature are based on this concept.

The power efficiency of the rake receiver and/or of the multiuser detection is greatly influenced by the quality of the channel estimates. Consequently, CDMA systems are strongly dependent on the use of an adaptive power control in order to achieve a desired capacity of the overall system and transmission quality. The term "power control" in this case covers both the fast power control for reaction to fading, and the longer-term adaptation of the transmit power which is required, for example in the case of a change in data rate.

With all currently existing CDMA systems it is usual to undertake such power control in blockwise fashion, such that the transmit power is held constant in each case over individual blocks of symbols and is changed discontinuously between individual blocks.

Since each channel estimate is thereby generally influenced by received values from different blocks, different power levels being assigned to the various blocks in systems with power control, this results in the need to combine symbols with different transmit power levels. if these different transmit power levels are not taken into account explicitly, this can therefore lead to a lower quality of the channel estimation results. However, this problem is ignored in systems of the prior art, and/or a palpable degradation of the channel estimate caused by this discontinuity is accepted.

SUMMARY OF THE INVENTION

It is an object of the invention to avoid the indicated problems of the prior art, in particular the degradation described.

It is also an object of the invention to indicate an efficient way which, particularly in the case of CDMA systems with power control, ensures estimates of higher quality than when use is made of methods according to the prior art, and simultaneously largely avoids a substantial increase in the complexity of system implementation.

The solution according to the invention is supplied by a method, a CDMA receiver and an implementation program having the features of claims 1, 14 and 18, respectively.

Advantageous and/or preferred embodiments and/or developments are the subject-matter of the respective sub-claims.

For the purpose of parameter estimation methods, which are as efficient as possible, in particular for the purpose of estimating a channel pulse response in the case of a CDMA transmission, the invention provides for estimating a correction factor with which different power levels of various receiving blocks can be equalized for the parameter estimate. Discontinuous variations in the received signal of the parameter estimate can therefore be avoided by estimating and compensating a power control factor.

Since power control information is transmitted, for example in the case of UMTS systems, only with a relatively low reliability, it is provided in a preferred development to use methods of the statistical hypothesis test to estimate power control factors. An advantage of this is that analytical expressions can be specified for the method on the basis of the description of the attenuation of transmission channels in mobile radio, and also of superimposed noise as complex Gaussian processes. The estimate of the power control factor is, moreover, preferably based on a maximum a-posteriori approach, a decision going to the power control factor for which the probability of occurrence is a maximum in terms of measurement of prescribable observed variables. According to the invention, different observed variables are specified for individual preferred estimation methods, it being possible to estimate advantageously both with the aid of received values which are assigned the pilot symbols, and with the aid of received values which are assigned to unknown data. Furthermore, the method according to the invention is also suitable for profitable application in estimating further parameters such as, for example, a frequency offset between a transmitter and a receiver.

The method according to the invention, and the receiver adapted according to the invention for carrying out the method therefore ensure a rise in the quality of parameter estimation at the receiving end, such as, in particular, channel estimation in CDMA systems with power control.

Since, particularly with the use of a rake receiver to reconstruct the transmitted data, the detection is substantially based on channel estimates and/or estimates of other parameters such as, for example, the frequency offset, the improvement in parameter estimation therefore leads to a reduction in the bit error rate of the transmission system, which therefore entails a possible saving in the required transmit power, and thus a higher overall capacity. By contrast, in practical implementation this leads only to a slight extra outlay.

BRIEF DESCRIPTION OF THE DRAWINGS

The invention is described in detail below by way of example with the aid of preferred exemplary embodiments and with reference to the attached drawings, in which:

FIG. 2 shows a block diagram corresponding to FIG. 1, but without the account of the power control;

DETAILED DESCRIPTION

Figure 1:
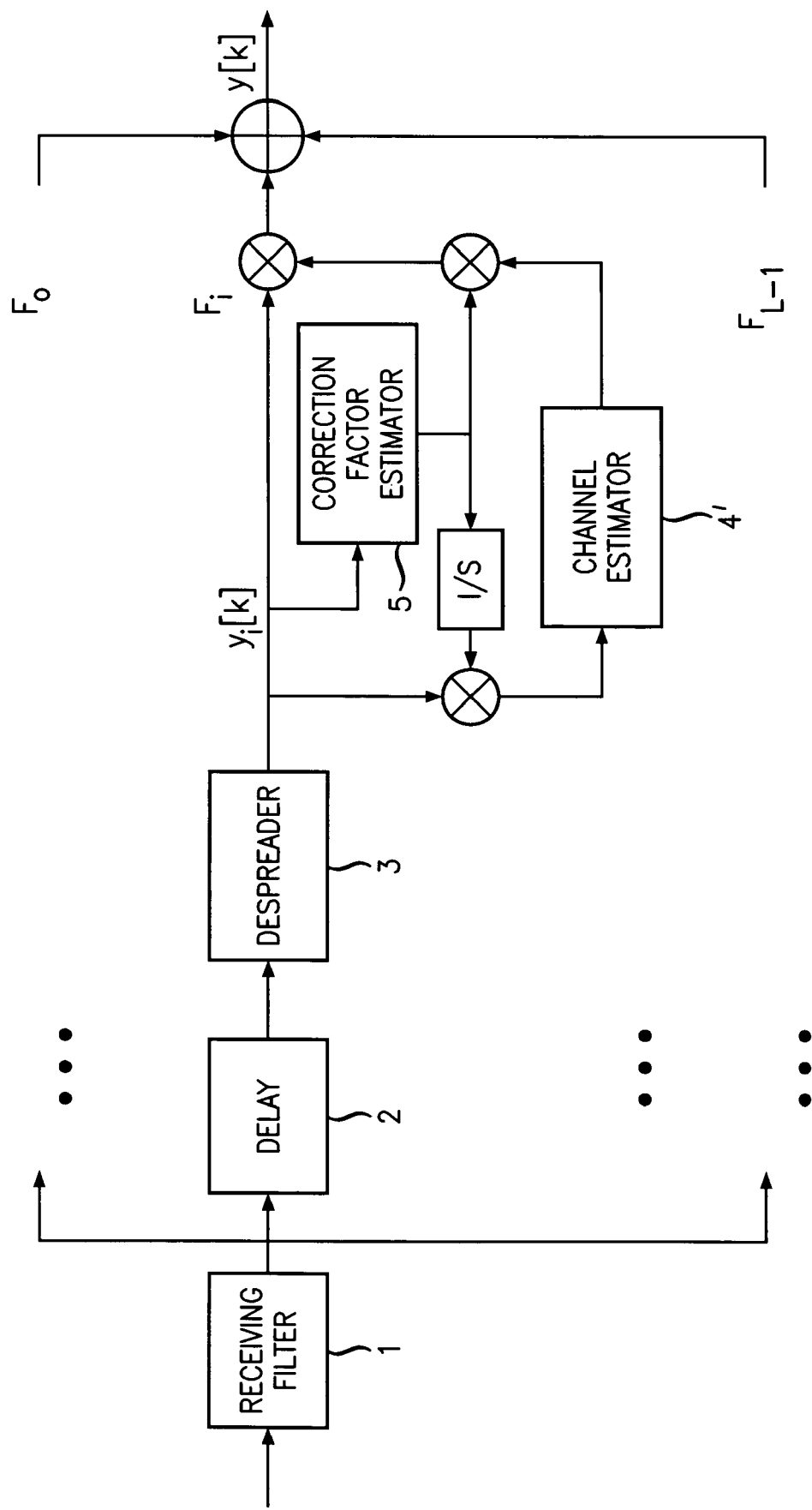
FIG. 1 shows a simplified block diagram of a rake receiver with maximum ratio combining, taking explicit account of the power control.

For a better understanding of the approach according to the invention, and of the system model on which the following description is based, reference is firstly made to FIG. 2, which illustrates a simplified block diagram of a rake receiver for a transmission with DS-CDMA (Direct Sequence Code Division Multiple Access) for a linearly distorting channel. As is known per se to the person skilled in the art, after traversing a receiving filter 1 an input signal coming from an antenna is processed for this purpose in paths, the so-called fingers $F_0, F_i, F_{L-1}$, of the rake receiver, comprising a plurality of devices, in particular for delay 2, despreading 3 and channel estimation 4.

The time-discrete output signal y[k] of the rake receiver in accordance with FIG. 2 is given in this case by $$y[k] = \sum_{i=0}^{L-1} y_i[k] \hat{h}_i^*[k] \quad (1)$$

L denoting the number of the fingers $F_0, F_i, F_{L-1}$ of the rake receiver. If propagation times which occur are ignored in order to simplify the representation, the output signal $y_i[k]$ of the ith finger $F_i$ in accordance with FIG. 2 is given by $$y_i[k] = h_i[k] \cdot a[k] \cdot s + n_i[k], i \in \{0, 1, \ldots, L-1\} \quad (2)$$

The sequence a[k] in this case includes the transmitted symbols which, depending on the modulation method used, can either be truly real or complex. The parameters $h_i[k]$ constitute time-dependent weighting factors relating to the ith rake finger $F_i$, which are given by the channel pulse response, the parameter $\hat{h}_i[k]$ in equation (1) denoting the estimated channel weighting factor relating to the ith rake finger $F_i$, which is determined by the channel estimating device 4 in FIG. 2. The parameters $n_i[k]$ denote interfering signals of the ith rake finger $F_i$, which are conventionally composed of different components, for example white noise and MAI (Multiple Access Interference). The factor s constitutes a weighting factor which influences the power of the received signal, that is to say exerts power control (fast power control or longer term power matching), and is constant for the receiving blocks of duration K.

As is further known to the person skilled in the art in this field, both $\hat{h}_i[k]$, and $n_i[k]$ can be assumed to a good approximation in many mobile radio applications to be complex average less Gaussian processes, this assumption forming the basis of the following description.

In the case of the UMTS systems, for example, the power control factor s is suddenly communicated to the receiver, but the corresponding reception symbols are not highly reliable, since the requirement for a short delay renders it impossible to use a powerful channel coding for these symbols. In general, the receiver therefore has no precise knowledge of the factor s, and so it is therefore necessary, rather, essentially to consider all possibilities for s. Their (a-priori) probabilities can be determined with the aid of the reception symbols containing the power control information, and of the corresponding symbol error probabilities.

For the sake of simplicity, the symbols of each block are enumerated with a constant power control factor s at discrete times $k \in \{0, 1, \ldots, K-1\}$. It is further assumed that each block $K_p$ includes pilot symbols, known to the receiver, at the positions $k_0, k_1, \ldots, k_{Kp-1}$. Channel estimation for determining the factors $h_i[k]$ can be undertaken with the aid of the received values $y_i[k_0], y_i[k_1], \ldots, y_i[k_{Kp-1}]$, in which case various methods based, for example, on filtering and/or interpolation are known for this purpose from the literature, for example from publications by J. K. Cavers, "An Analysis of Pilot Symbol Assisted Modulation for Rayleigh Fading Channels", Transactions on Vehicular Technology, VT-40: 686-693, November 1991; G. Auer et al., "Adaptive Mobile Channel Prediction for Decision Directed Rake Receivers", IEE Colloguium on Adaptive Signal Processing for Mobile Communications Systems, pages 13/1-13/5, October 1997; H. Andoh et al., "Channel Estimation Filter Using Time-Multiplexed Pilot Channel for Coherent Rake Combining in DS-CDMA Mobile Radio", IEICE Trans. Commun., E81-B(7): 1517-1526, July 1998.

It is also possible with these methods to incorporate into the channel estimate received values which correspond to data symbols, doing so by applying the principles of decision feedback. This results in an increase in the quality of estimation.

Figure 3A:
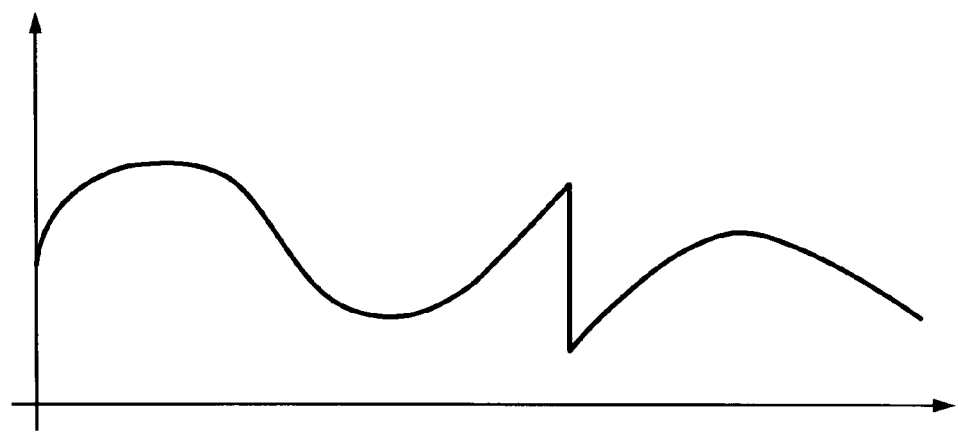
FIG. 3a shows an input signal for a parameter estimate without compensation of the power control.
Figure 3B:
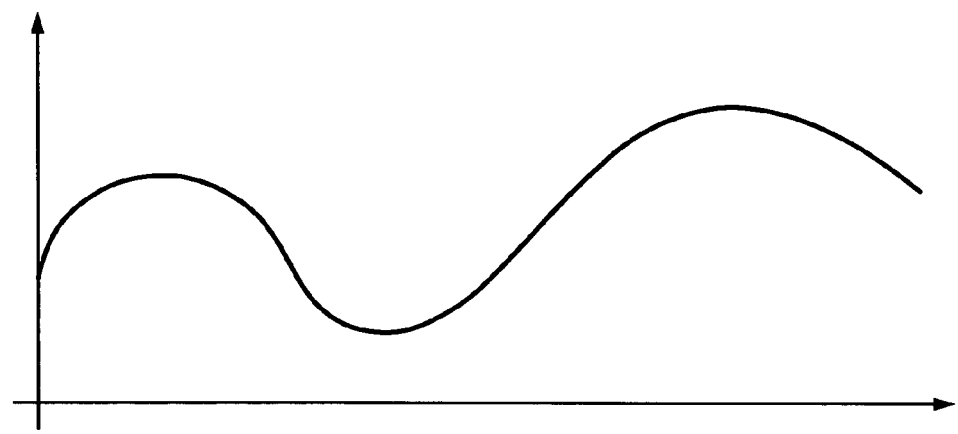
FIG. 3b shows an input signal for a parameter estimate with compensation of the power control.

It is known to the person skilled in the art that received values from different blocks generally influence the current channel estimate, the consequence of which is that symbols are combined with various power control factors s, as may be seen from FIG. 3b) for example. As already mentioned above, this can result in a degradation in the adaptation of the channel estimating filter or in a lower quality of the result of channel estimation. Furthermore, a similar problem also occurs, for example in frequency offset estimation methods which operate with estimates for the channel autocorrelation sequence, reference being made for this purpose by way of example to the publication by W.-Y. Kuo et al. "Frequency Offset Compensation of Pilot Symbol Assisted Modulation in Frequency Flat Fading", Transactions on Communications, COM-45: 1412-1416, November 1997.

In a departure from the parameter estimation methods according to the prior art, in which these problems are ignored or a resulting degradation is accepted, the approach of the method according to the invention is to estimate the power control factor s and thereafter compensate it in order, in particular, to avoid abrupt discontinuities in the input signal of the parameter estimate, as shown in FIG. 3b).

Figure 4:
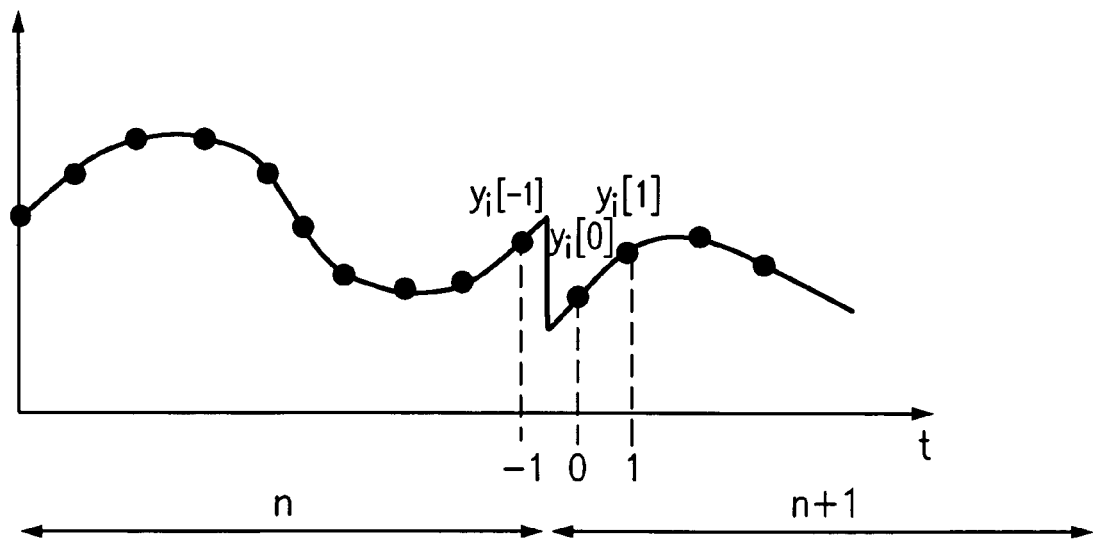
FIG. 4 shows an input signal of a rake finger for estimating a power control factor.

The estimation to be carried out for this purpose is described below with reference to FIGS. 1 and 4.

It is generally impossible to make direct use of the factor s communicated to the receiver by the transmitter, since the symbols which include this information are mostly not sufficiently reliable. It is therefore provided in order to estimate the factors to apply methods of the statistical hypothesis test as disclosed, for example, in the publication by A. D. Whalen, "Detection of Signals in Noise", Academic Press, New York, 1971 and to be regarded as a part of the present disclosure content. In accordance with FIG. 1, following estimation, carried out in a device 5, of the correction factor s, that is to say substantially of the power control factor, values $1/s \cdot y_i[k]$, in which abrupt changes in power no longer occur, are made available to the device 4' for parameter estimation (for example channel estimation), and this improves the result of parameter estimation.

In order to carry out estimation of the factor s, it is preferred to consider the first M output values of each rake finger $F_0$, $F_i$, $F_{L-1}$ per block n, n+1. These values are combined in reception vectors $$y_i = [y_i[0] y_i[1] \ldots y_i[M-1]]^T, \; i \in \{0, 1, \ldots, L-1\} \quad (3)$$

$(.)^T$ denoting transposition. On the basis of this, interest now attaches, in particular, to the overall density of $y_i$ the case of M=2 being described below by way of example. Since $h_i[k]$ and $n_i[k]$ can be taken as complex Gaussian processes, the result for given values of s, a[0] and a[1] (compare equation (2)) as conditional density for $y_i$ is a two-dimensional complex Gaussian density with the probability density function of $$p(y_i \mid s, a[0], a[1]) = \frac{1}{\pi^2 \mid \det(M_i) \mid} \exp(-y_i^H M_i^{-1} y_i), \quad (4)$$

$(.)^H$ denoting Hermitian transposition of the matrix, and the autocorrelation matrix $M_i$ being given by $$M_i = E\{y_i y_i^H \mid s, a[0], a[1]\} = \begin{bmatrix} \sigma_i^2 & \rho_i^* \sigma_i^2 \\ \rho_i \sigma_i^2 & \sigma_i^2 \end{bmatrix}, \quad (5)$$

The following definitions hold here:

$$\sigma_i^2 = E\{\mid h_i[0]a[0]s + n_i[0] \mid^2\} \quad (6)$$
$$= E\{\mid h_i[1]a[1]s + n_i[1] \mid^2\}$$
$$= \sigma_{h,i}^2 s^2 + \sigma_{n,i}^2,$$

where $$\sigma_{h,i}^2 = E\{\mid h_i[k] \mid^2\} \quad (7)$$

$$\sigma_{n,i}^2 = E\{\mid n_i[k] \mid^2\} \quad (8)$$

and $$\rho_i = \frac{E\{(h_i[0]a[0]s + n_i[0])^* \cdot (h_i[1]a[1]s + n_i[1])\}}{\sigma_i^2} \quad (9)$$

$$= \frac{\varphi_{h_i h_i}[1]a[0]a[1]s^2 + \varphi_{n_i n_i}[1]}{\sigma_i^2},$$

$\sigma_i^2$, $\sigma_{h,i}^2$ and $\sigma_{n,i}^2$ respectively representing the variance of the output signal of the ith rake finger $F_i$, the variance of the channel weighting factor relating to the ith rake finger $F_i$ and the noise variance at the ith rake finger $F_i$ and the $\phi_{h_i h_i}[\kappa]$ and $\phi_{n_i n_i}[\kappa]$ representing the autocorrelation sequences of $h_i[k]$ and $n_i[k]$ respectively, where $\phi_{h_i h_i}[\kappa] = E\{h_i[k+\kappa]h_i^*[\kappa]\}$ and $\phi_{n_i n_i}[\kappa] = E\{n_i[k+\kappa]n_i^*[\kappa]\}$.

The determination of the autocorrelation functions and variances $\sigma_{h,i}^2$ and $\sigma_{n,i}^2$ can be performed in the receiver, for example with the aid of the channel estimates. It is to be noted that $\sigma_i^2$ is a function of the power control factor s to be tested, and the correlation coefficient $\rho_i$ is, furthermore, a function of a[0] and a[1].

Furthermore, consideration will be given for what follows to the case of white noise $n_i[k]$, that is to say, $\phi_{n_i n_i}[\kappa] = 0$, $\kappa \neq 0$ which case mostly obtains in practice to a good approximation. This leads to $$\rho_i = \frac{\varphi_{h_i h_i}[1]a[0]a[1]s^2}{\sigma_i^2}. \quad (10)$$

A vector (or else scalar)

$$u_i = f(y_i) \quad (11)$$

is formed before estimation of the power control factor s. It is generally known to be necessary to assume that no pilot symbols are assigned to the time steps 0, 1, ..., M−1 under consideration, and that the corresponding transmission symbols are therefore unknown for the estimation. In other words, no use can be made of decided data, since obtaining them requires knowledge of channel estimates, whereas a is estimated upstream of the channel estimation in the current block. The vectorial or scalar function f(.) serves the purpose of keeping the influence of the unknown data symbols as slight as possible, it also being possible, as described at a later junction, to cover the case of known pilot symbols by suitable definition of f(·).

Although it is also possible in principle to use criteria known to the person skilled in the art to estimate the factor s, a maximum a-posteriori approach is used below for the exemplary description. The estimated factor is therefore determined in accordance with $$\hat{s} = \text{argmax } p(s \mid u_0, u_1, \ldots, u_{L-1}), \quad (12)$$

$p(s \mid u_0, u_1, \ldots, u_{L-1})$ denoting the conditional probability density function of s with $u_0, u_1, \ldots, u_{L-1}$ being known.

Bayes' theorem is used to obtain the expression which is accessible for numerical evaluations, that is to say:

$$p(s \mid u_0, u_1, \ldots, u_{L-1}) = \frac{p(u_0, u_1, \ldots, u_{L-1} \mid s) Pr(s)}{p(u_0, u_1, \ldots, u_{L-1})}. \quad (13)$$

Equation (13) is to be evaluated in this case for all possibilities, that is to say hypotheses for the factor s. Here, $\rho(u_0,u_1,\ldots,u_{L-1}1)$ can be neglected as an irrelevant factor for determining the most likely value, and the calculations of the a-priori probabilities Pr(s) can be carried out in a simple way with the aid of the error probabilities relating to the symbols containing the power control information. Furthermore, the overall density $\rho(u_0,u_1,\ldots,u_{L-1}|s)$ to be calculated can be simplified. Since the channel coefficients $h_i[k]$ for various rake fingers $F_0, F_i, F_{L-1}$ can be modelled in a fashion statistically independent of one another, as can the interference processes $n_i[k]$, it is possible with a suitable selection of the function f(.) to assume the validity of the factorization $$\rho(u_0,u_1,\ldots,u_{L-1}|s) \approx \rho(u_0|s) \cdot \rho(u_1|s). \tag{14}$$

The function f(·) must be known in order to determine the density functions $\rho(u_i|s)$. Three preferred possibilities for forming f(.) are discussed below.

A first possibility, without the need to know training frequencies on the part of the receiver, consists in forming the squares of absolute values component by component, that is to say $$f(y_i) = [|y_i[0]|^2 \, |y_i[1]|^2 \ldots |y_{i[M-1]}|^2]^T. \tag{15}$$

Furthermore, the number of the symbols is selected as M=2, and binary antipodal modulation is assumed, such as is used, for example, in UMTS systems, that is to say $a[k] \in \{\pm 1\}$. The representation $$p(u_i|s) = \sum_{a[0] \in \{\pm 1\}} \sum_{a[1] \in \{\pm 1\}} p(u_i|s, a[0], a[1]) Pr(a[0], a[1]), \tag{16}$$

is selected for calculating $p(u_i|s)$.

The calculation of an overall probability density function of the squares of absolute values of two correlated complex Gaussian random variables, the calculation of $\rho(u_i=f(y_i)|s,a[0],a[1])$ in the case under consideration, proves to be a standard problem for the case of a two-dimensional complex Gaussian density for $y_i$ for given s, a[0] and a[1]; its solution is known from the literature, for example from publications by M. Schwartz et al. "Communication Systems and Techniques", McGraw-Hill, New York 1966 and by C. W. Helstrom, "The Resolution of Signals in White, Gaussian Noise", Proceedings of the IRE, 43:1111-1118, September 1955. With $\sigma_i^2$ and $\rho_i$ in accordance with equation (6) and equation (10) respectively, and the modified Bessel function of first kind of zero order $$I_0(\chi) = \frac{1}{2\pi} \int_0^{2\pi} \exp(\chi \cos\varphi) d\varphi_i \tag{18}$$

the result is $$p(u_i = f(y_i)|s, a[0], a[1]) = \tag{17}$$

$$\frac{1}{\sigma_i^4(1-|\rho_i|^2)} \exp\left(-\frac{|y_i[0]|^2+|y_i[1]|^2}{\sigma_i^2(1-|\rho_i|^2)}\right) I_0\left(\frac{2|y_i[0]||y_i[1]||\rho_i|}{\sigma_i^2(1-|\rho_i|^2)}\right),$$

compare, for example, the abovementioned publication by M. Schwartz et al. In accordance with equation (10), the absolute value of $\rho_i$ is independent of a[0] and a[1] for binary antipodal modulation and white noise. This results in accordance with equations (16) and (17) in $$p(u_i|s) = \tag{19}$$

$$\frac{1}{\sigma_i^4(1-|\rho_i|^2)} \exp\left(-\frac{|y_i[0]|^2+|y_i[1]|^2}{\sigma_i^2(1-|\rho_i|^2)}\right) I_0\left(\frac{2|y_i[0]||y_i[1]||\rho_i|}{\sigma_i^2(1-|\rho_i|^2)}\right),$$

where $$\sigma_i^2 = \sigma_{n,i}^2 s^2 + \sigma_{n,i}^2, \tag{20}$$

and $$|\rho_i| = \frac{|\varphi_{h_i d_i}[1]|s^2}{\sigma_i^2}. \tag{21}$$

A simplification can be undertaken given low signal-to-noise ratios, which occur as a rule at the outputs of the individual rake fingers $F_0, F_i, F_{L-1}$. Use may be made in this case of the approximation $$(\ln(I_0(\chi)) \approx \chi^2/4 \tag{22}$$

which is valid for small arguments and which leads to $$\ln(p(u_i|s)) = \tag{23}$$

$$\ln\left(\frac{1}{\sigma_i^4(1-|\rho_i|^2)}\right) - \frac{|y_i[0]|^2+|y_i[1]|^2}{\sigma_i^2(1-|\rho_i|^2)} + \frac{|y_i[0]|^2|y_i[1]|^2|\rho_i|^2}{\sigma_i^4(1-|\rho_i|^2)^2}$$

supplementary reference being made for this purpose by way of example to the publication by D. Raphaeli, "Non-coherent Coded Modulation", Transactions on Communications, COM44:172-183, February 1996. Finally, using equation (13) and equation (14) the estimated power control factor s is yielded as that value which maximizes the expression $$\sum_{i=0}^{L-1} \left( \ln\left(\frac{1}{\sigma_i^4(1-|\rho_i|^2)}\right) - \frac{|y_i[0]|^2+|y_i[1]|^2}{\sigma_i^2(1-|\rho_i|^2)} + \frac{|y_i[0]|^2|y_i[1]|^2|\rho_i|^2}{\sigma_i^4(1-|\rho_i|^2)^2} \right) + \ln(Pr(s))$$

As a second possibility, the squares of the absolute values of the individual received values can be summed to form the function f(·), that is to say $$f(y_i) = \sum_{\mu=0}^{M-1} |y_i[\mu]|^2. \tag{24}$$

M=2 is chosen again by way of example, and the case of binary antipodal modulation is considered. The conditional density function of $u_i = f(y_i)$ for a given s can be derived starting from the publication by M. Schwartz already referred to. Once again, the expression independent of a[0] and a[1] is yielded for the conditional density ρ(f(u_i)|s,a[0], a[1]), leading finally to $$p(u_i \mid s) = \frac{1}{2|\rho_i|\sigma_i^2} \tag{25}$$
$$\left( \exp\left(-\frac{|y_i[0]|^2 + |y_i[1]|^2}{\sigma_i^2(1+|\rho_i|)}\right) - \exp\left(-\frac{|y_i[0]|^2 + |y_i[1]|^2}{\sigma_i^2(1-|\rho_i|)}\right) \right)$$

equations (20) and (21) holding, respectively, in turn for $\sigma_i^2$ and $|\rho_i|$. Starting therefrom, it is therefore possible to use equations (13) and (14) to specify directly the target function to be maximized as a function of s, more specifically $$\prod_{i=0}^{L-1} \left( \frac{1}{2|\rho_i|\sigma_i^2} \right.$$
$$\left. \left( \exp\left(-\frac{|y_i[0]|^2 + |y_i[1]|^2}{\sigma_i^2(1+|\rho_i|)}\right) - \exp\left(-\frac{|y_i[0]|^2 + |y_i[1]|^2}{\sigma_i^2(1-|\rho_i|)}\right) \right) \right) \cdot Pr(s)$$

A further preferred possibility consists in directly using $y_i$ to estimate s, that is to say, $u_i = y_i$ in the case of the occurrence of training symbols, known at the receiving end, at the points $k \in \{0, 1, \ldots, M-1\}$. The case of M=2 and a[0]=a[1]=will be considered as an example. The resulting conditional density function is $$p(u_i = y_i \mid s) = \tag{26}$$
$$\frac{1}{\pi^2 \sigma_i^4 (1-|\rho_i|^2)} \exp\left(-\frac{|y_i[0]|^2 + |y_i[1]|^2 - 2\text{Re}\{p_i y_i''[1] y_i[0]\}}{\sigma_i^2(1-|\rho_i|^2)}\right),$$

where $$\sigma_i^2 = \sigma_{h,i}^2 s^2 + \sigma_{n,i}^2, \tag{27}$$

$$\rho_i = \frac{\varphi_{h_i h_i}[1] s^2 + \varphi_{s_i n_i}[1]}{\sigma_i^2} \tag{28}$$

Equations (13) and (14) can therefore be used to set up the target function, which is to be maximized as a function of s, as $$\sum_{i=0}^{L-1} \left( \ln\left(\frac{1}{\sigma_i^4(1-|\rho_i|^2)}\right) - \frac{|y_i[0]|^2 + |y_i[1]|^2 - 2\text{Re}\{p_i y_i^*[1] y_i[0]\}}{\sigma_i^2(1-|\rho_i|^2)} \right) +$$
$$\ln(Pr(s))$$

Whereas the above exclusively considered the case of considering only signal values of the new receiving block n+1 to estimate s, that is to say after a change in the power control factor s, an estimate can also be made by additionally considering received values of the old block n. As an example, the use of received values from an old and a new receiving block n and n+1, respectively, are considered (FIG. 4) below for this purpose, that is to say in the case of M=2 the received vector relating to the ith rake finger $F_i$ is formed as $$y_i = [y_i[-1]\ y_i[0]]^T. \tag{29}$$

It is assumed, furthermore, that the compensation of the power control factor s has already been undertaken for the old received value. A Gaussian density in accordance with equation (4) is yielded once again as conditional density ρ(y_i|s,a[−1],a[0]), the result for the autocorrelation matrix now being $$M_i = \begin{bmatrix} \sigma_{h,i}^2 + \sigma_{n,i}^2/s_0^2 & \varphi_{h_i h_i}^*[1]a[-1]a^*[0]s + \varphi_{n_i n_i}^*[1]/s_0 \\ \varphi_{h_i h_i}[1]a^*[-1]a[0]s + \varphi_{n_i n_i}[1]/s_0 & \sigma_{h,i}^2 s^2 + \sigma_{n,i}^2 \end{bmatrix} \tag{30}$$

Here, $s_0$ denotes the already determined power control factor of the old block n. As a person skilled in the art in this field will recognize, it is therefore possible to use this result once again to derive target functions for estimating s for the three possibilities discussed above which are based on function f(·) and binary antipodal modulation.

In a practical implementation, in particular inside a receiver of a CDMA-based mobile radio system, the method entails only a slight extra outlay and is started in relation to any period of the power control. After the storage of the samples $y_i[k]$ for all L rake fingers, the latter are therefore additionally preprocessed with the formation of the function f(·) based, in particular, on one of the three preferred possibilities described above.

Consequently, it is subsequently possible in conjunction with consideration of the a-priori probability Pr(s) for the occurrence of a power control factor s which is known per se from a transmitted power control command and the uncoded error rate then to set up a target function for all possible power control factors s, it being possible to use samples from a receiving block n+1 or, alternatively, received values from different blocks n, n+1 (FIG. 4): for example, when selecting the number of symbols to be considered in relation to M=2, either the samples $y_i[0]$ and $y_i[1]$ from the new receiving block n+1 or, alternatively, the samples $y_i[-1]$ and $y_i[0]$ from different receiving blocks. The estimate for the power control factor s actually occurring is thereupon selected as that for which the target function can be maximized.

The method according to the invention for estimating the correction factor can therefore be performed both with the aid of received values which are assigned to pilot symbols, and with the aid of received values which are assigned to unknown data.

The method according to the invention ensures enhancement of the quality of the parameter estimation, thus ensuring a reduction in the bit error rate of the transmission system and/or in a possible saving of necessary transmit power.

The invention claimed is:

1. A method for improving the reception of a CDMA receiver based on parameter estimation, including the steps:
    obtaining received values of a received signal;
    using a statistical hypothesis test to estimate the discontinuity of power levels of the received signal and correction factors resulting therefrom, the correction factors serving to equalize different power levels of the received signal;

providing the received values with the correction factors; and producing parameter estimates by processing the received values provided with the correction factors;

and including the step of, in the statistical hypothesis test, using a-priori probability for the presence of a specific discontinuity of a transmit power level to improve the estimation of the current discontinuity of the transmit power level of the received signal.

2. The method according to claim 1, including the step of estimating a power control factor to provide parameters which reproduce the currently estimated discontinuity of a transmit power level.

3. The method according to claim 2, wherein the step of estimating includes estimating the discontinuity of the transmit power between two blocks respectively assigned to a transmit power.

4. The method according to claim 1, wherein to estimate the correction factors, the parameter estimation uses a vector from component-by-component squares of absolute values of the received signal to carry out the statistical hypothesis test.

5. The method according to claim 4, including the step of carrying out the statistical hypothesis test using sums of squares of the absolute values.

6. The method according to claim 1, including the step of carrying out the statistical hypothesis test during the reception of received values corresponding to training symbols.

7. The method according to claim 1, wherein only received values from the block belonging to the power control factor to be estimated are used to estimate the power level.

8. The method according to claim 1, wherein received values from the block belonging to the power control factor to be estimated; and from the preceding block are used to estimate the power level.

9. The method according to claim 1, wherein, if a discontinuity occurs, the estimation of discontinuities of the power control factors signals further estimation methods and is used as a basis for the latter.

10. The method according to claim 9, wherein the further estimation methods involve the estimation of properties of the transmission channel.

11. The method according to claim 10, characterized in that the further estimation methods involve the estimation of the transmitted bit stream.

12. A CDMA receiver comprising a parameter estimation device for carrying out a parameter estimation method and a correction factor device for providing correction factors, wherein estimates are produced by processing received values provided with correction factors, the correction factors serving to equalize different power levels of a received signal, and wherein the discontinuity of power levels and the correction factors resulting therefrom are estimated using a statistical hypothesis test and are assigned to the received values. and wherein the receiver is a rake receiver and signals from more than one finger of the rake receiver are used to carry out the statistical hypothesis test.

13. The CDMA receiver according to claim 1, wherein more than one finger of the rake receiver includes a parameter estimation device.

* * * * *